May 25, 1943.  R. U. ROURKE  2,319,782
ADJUSTABLE POINTER
Filed Feb. 23, 1942
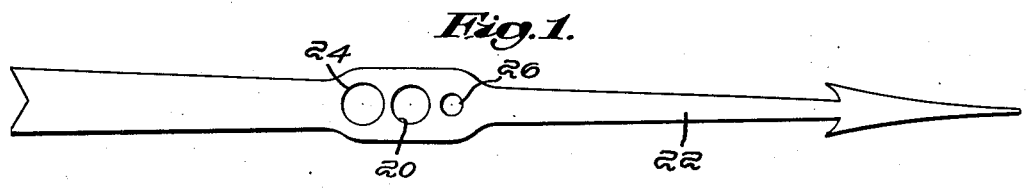
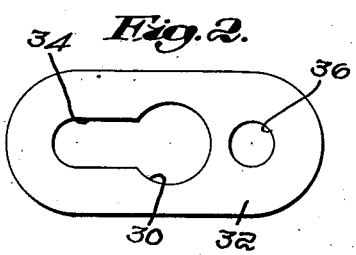
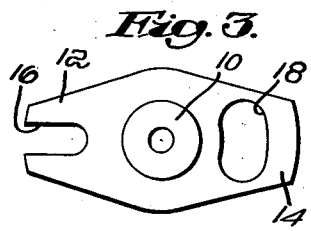
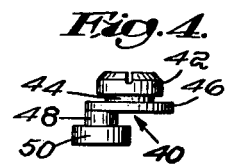
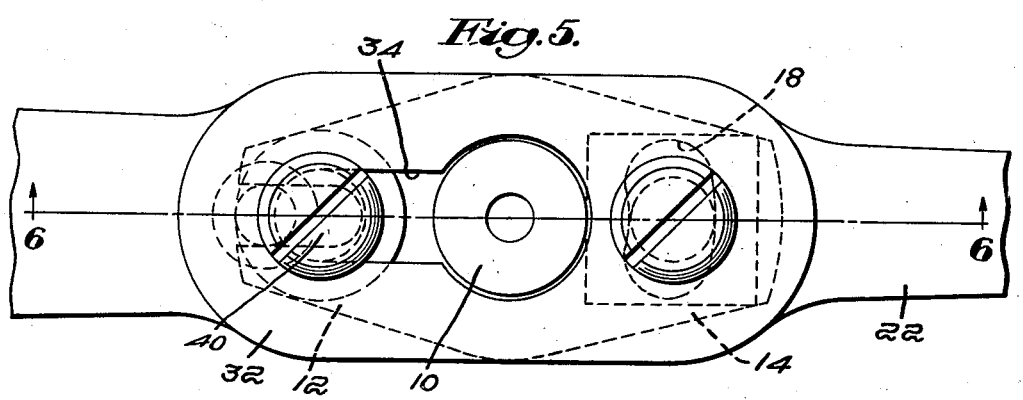
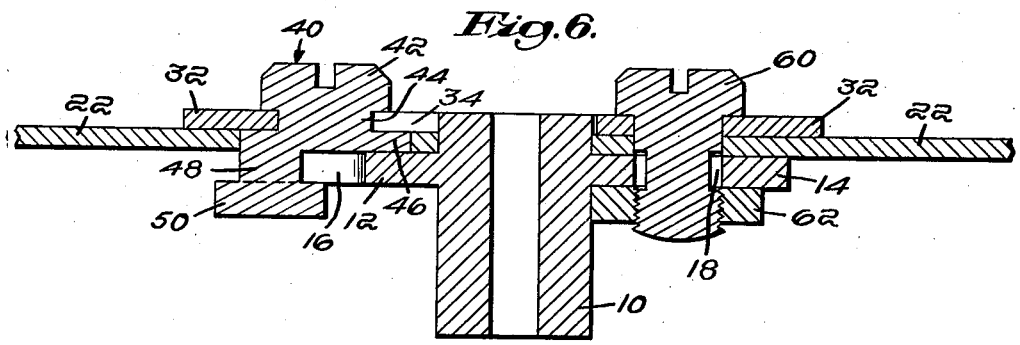
Inventor:
Robert Usher Rourke
by Kenway & Witter
Attorneys Patented May 25, 1943

2,319,782

UNITED STATES PATENT OFFICE 2,319,782

ADJUSTABLE POINTER

Robert Usher Rourke, Webster, Mass., assignor to Waterhouse Company, Webster, Mass., a corporation of Massachusetts Application February 23, 1942, Serial No. 432,012

4 Claims. (Cl. 116—129)

My invention relates to gauges and consists more particularly in an improved and adjustable pointer useful with various kinds of gauges.

Pressure gauges are often subject to excessive vibration and to other influences which tend to disturb their correct setting and so to vary their response as indicated by the pointer playing over the calibrated dial. A gauge which is accurate when it leaves the factory may change within a few months so that, for example, when one hundred pounds pressure is applied to it, the pointer may indicate more or less than that amount. When pressure on a gauge is suddenly released, the pointer is apt to strike hard against the stop pin at the zero point and to turn on its spindle. To correct such displacement it has been sometimes necessary to pull the pointer from its spindle, turn the pointer relative to the spindle and then force it down again on the spindle. However, it has been impossible by this method to adjust the pointer with the high degree of accuracy required in such instruments since the pointer is very apt to turn relative to the spindle as it is being replaced. Furthermore, pointers often are so tightly fitted to their spindles that it is impossible to remove them without serious damage.

Although attempts have been made in the past to make pointers adjustable, the locking devices used to maintain the pointer in its adjusted position have either been so loose that they do not function or so tight that fine adjustment is not possible.

The most important object of my invention is to provide mechanism by means of which the pointer of a gauge may be freely and precisely adjusted with respect to its spindle and then locked firmly in adjusted position.

An important feature of the invention is a cam motion interposed between the pointer and the hub member which secures the pointer to the spindle of the gauge movement, by means of which cam motion the pointer may be nicely adjusted. Another feature of the invention resides in the combination of a screw-headed cam and a locking screw both of which are exposed through the pointer so that access to the locking and adjusting means is easily and conveniently effected. My improved mechanism is, moreover, advantageous because of its simplicity of design and low cost of manufacture.

These and other objects and features of the invention will be more readily appreciated from the following detailed description of a preferred embodiment thereof, selected for purposes of illustration and shown in the accompanying drawing, in which—

Fig. 1 is a plan view of a pointer,

Fig. 2 is a plan view of the top plate,

Fig. 3 is a plan view of the bushing,

Fig. 4 is a view in side elevation of the cam,

Fig. 5 is a plan view on an enlarged scale of the assembled mechanism, and

Fig. 6 is a similar view in cross section along the line 6—6 of Fig. 5.

The pointer mechanism of my invention is adapted for use with any standard type of gauge in which a spindle projects through a calibrated dial and is rotated according to the forces applied to the gauge. The pointer is carried by a hub member 10 provided with a central bore adapted to receive the spindle (not shown). The hub member fits tightly over the spindle so that there is no relative motion between them. Integral with the hub member 10 is a flat flange or plate forming in effect a rearwardly directed extension 12 and a forwardly directed extension 14. In the extension 12 there is formed a radial slot or notch 16 and in the forward extension 14 there is a curved transverse slot 18. The barrel of the hub member 10 extends somewhat above the plane of the extensions 12 and 14 and is received in a circular opening 20 formed in the center of the pointer 22. The pointer has a widened central section and in this, to the rear of the opening 20 is provided a slightly larger circular opening 24 and at the rear of the opening 20 is provided a smaller hole 26.

A flat top or keeper plate 32 overlies the pointer and is provided with a key hole opening 30 formed to receive the extreme upper end of the barrel of the hub member 10. The radially disposed portion 34 of the key hole slot extends rearwardly of the pointer and on the opposite side of the slot 34 there is a smaller circular opening 36.

As shown in Fig. 4 a cam 40 is provided with a slotted head 42 and a reduced neck portion 44 which is received in the slot 34 of the top plate 32. Below the neck 44 is a considerably enlarged thin cylindrical portion 46 which fits in the circular opening 24 of the pointer 22. Below the cylindrical portion 46 is a smaller cylindrical portion 48 which is eccentric with respect to the portion 46 and which works in the radial slot 16 formed in the flange extension 12 of the hub member. The cam terminates in another cylindrical portion 50 co-axial with the portion 48 but considerably larger in diameter. It will now be seen that when the cam 40 is rotated, as by means of a screw driver, the rotation of the eccentric 48 in the slot 16 causes the lateral displacement of the pointer 22 and the top plate 32, thus swinging the pointer around the hub member without moving the spindle of the gauge movement.

In order to lock the pointer in a pre-selected position of adjustment I provide a screw 60 which extends through the hole 36 in the top plate 32, the hole 26 in the pointer 22, and through the curved slot 18 in the flange extension 14. The screw 60 carries a nut 62 at its lower end, and it will be evident that when the screw is tightened the pointer 22 is locked in place, that is it is clamped to the flange extension 14 and between it and the top plate 32.

When it is desired to adjust the position of the pointer with respect to the spindle of the gauge movement, the screw 60 is first loosened. Then by means of a screw driver or other suitable blade, the cam 40 may be rotated in either direction to cause the pointer to travel over the face of the dial of the gauge without effecting any movement of the spindle. When the pointer has been adjusted to the desired position, the screw 60 is once again tightened to lock the pointer in the new positoin. The function of the slot 16 is to provide bearing surfaces for the cam eccentric 48 to work upon and a slot is required since there will be some radial travel of the eccentric. The slot 34 in the top plate 32 is required to permit assembly of the top plate with respect to the pointer and the cam 40. The function of the relatively large cylindrical portion 50 of the cam is to maintain the top plate pointer and extension 12 in proper alignment.

It is obvious that other means of locking the pointer may be used to advantage but the means shown in the drawing is considered superior since it is simple and since it is easy to gain access to the screw head 60. The nut 62 is dimensioned so that it abuts against the barrel of the hub member 10 and cannot turn. The parts of the pointer mechanism, except for the cam, can easily be stamped, and the cost of manufacturing the entire mechanism is so low that it is well worth the slight cost to obtain the highly improved results of its addition.

Having now described and illustrated my invention what I claim as new and desire to secure by Letters Patent of the United States is:

1. Adjustable pointer mechanism, comprising the combination of a hub member adapted to be mounted on a shaft, a pointer, means supporting the pointer on the hub member for adjusting movement transversely of its rotary axis and with opposite end portions of the pointer located on opposite sides of said axis, a keeper plate superposed on the pointer over the hub member, a rotary adjustable eccentric member cooperating with the keeper plate, pointer and hub member on one side of the axis of the pointer for rotatably adjusting the pointer about the axis, and screw threaded means on the opposite side of the axis for securing the pointer against rotation relative to the hub member, said eccentric member and screw threaded means also embodying portions holding the keeper plate and pointer in assembled relation on the hub member.

2. The mechanism defined in claim 1 in which said portions of said eccentric member and screw threaded means engage outer faces of the keeper plate and hub member and hold the parts therebetween in assembled relation.

3. Adjustable pointer mechanism, comprising the combination of a hub member having a shaft receiving bore therein and a flange plate extending outwardly of the hub transversely of the bore, the plate having a radially extending slot at one side of the bore and a slot therein extending arcuately about the hub on the opposite side of the bore, a pointer fitting over the hub and resting on the flange plate, a keeper plate superposed on the pointer at the side opposite to the flange plate, rotary means extending through the keeper plate and pointer and having an eccentric portion in the radial slot for rotatably adjusting the pointer on the hub, and means on the opposite side of the hub and extending through the arcuate slot for securing the pointer against rotation relative to the hub.

4. The mechanism defined in claim 3 in which the pointer has three holes therethrough for receiving the hub, the rotary means and said securing means, and in which the keeper plate has a hole therethrough for receiving the last-named means and a hole together with a slot open thereinto for receiving the hub and the rotary means respectively.

ROBERT USHER ROURKE.